United States Patent [19]

Matsumoto et al.

[11] Patent Number: 6,001,278
[45] Date of Patent: Dec. 14, 1999

[54] ANTI-FERROELECTRIC LIQUID CRYSTAL COMPOSITION

[75] Inventors: Takahiro Matsumoto; Masahiro Johno; Tomoyuki Yui; Yuki Motoyama, all of Tsukuba, Japan

[73] Assignee: Mitsubishi Gas Chemical Co., Inc, Tokyo, Japan

[21] Appl. No.: 09/083,542

[22] Filed: May 22, 1998

[30] Foreign Application Priority Data

May 22, 1997 [JP] Japan .................................. 9-132485

[51] Int. Cl.$^6$ .......................... C09K 19/12; G02F 1/1343
[52] U.S. Cl. ............................... 252/299.65; 252/299.66; 252/299.67; 252/299.64; 349/143; 349/174; 349/184
[58] Field of Search ....................... 252/299.01, 299.64, 252/299.65, 299.66, 299.67; 349/143, 174, 184

[56] References Cited

U.S. PATENT DOCUMENTS

| | | | |
|---|---|---|---|
| 5,364,561 | 11/1994 | Isozaki et al. ...................... | 252/299.65 |
| 5,534,190 | 7/1996 | Johno et al. ........................ | 252/299.65 |
| 5,716,545 | 2/1998 | Kikuchi et al. .................... | 252/299.65 |

FOREIGN PATENT DOCUMENTS

| | | |
|---|---|---|
| 0497297 | 8/1992 | European Pat. Off. . |
| 0718274 | 6/1996 | European Pat. Off. . |
| 0829468 | 3/1998 | European Pat. Off. . |
| 879869 | 11/1998 | European Pat. Off. . |
| 885876 | 12/1998 | European Pat. Off. . |

OTHER PUBLICATIONS

Chandani et al., Tristable Switching in Surface Stabilized ... Polarization, Japanese Journal of Applied Physics, vol. 27, No. 5, pp. L729–L732, 1988.

Chandani et al, Novel Phases Exhibiting Tristable Switching, Japanese Journal of Applied Physics, vol. 28, No. 7, Jul. 1989, pp. L1261–L1264.

Chandi et al, Antiferroelectric Chiral Smectic Phases ... in MHPOBC, Japanese Journal of Applied Physics, vol. 28, No. 7, Jul. 1989, pp. L1265–L1268.

Johno et al, Smectic Layer Switching by an Electric Field ... Crystal Cells, Japanese Journal of Applied Physics, Vo. 28, No. 1, Jan. 1989, pp. L119–L120.

Johno et al, Correspondence between Smectric Layer Switching ... Mixture, Japanese Journal of Applied Physics, vol. 29, No. 1, 1990, pp. L111–L114.

Preprints of The 4th Ferroelectric Liquid Crystal International Symposium, Sep. 28 –Oct. 1, 1993, pp. 77.

Nakagawa, A Hysteresis Model for Antiferrolectric SmCA Phases, Japanese Journal of Applied Physics, vol. 30, No. 8, Aug. 1991, pp. 1759–1764.

*Primary Examiner*—Shean C. Wu
*Attorney, Agent, or Firm*—Sherman and Shalloway

[57] ABSTRACT

Provided are an anti-ferroelectric liquid crystal composition consisting essentially of (a) a swallow-tailed compound of the formula (1), (b) an anti-ferroelectric liquid crystal compound of the formula (2), and (c) a phenyl ester compound of the formula (3), and a liquid crystal display device using the composition,

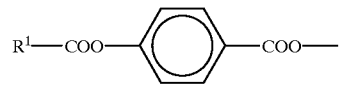

(1)

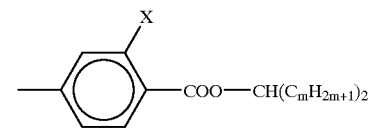

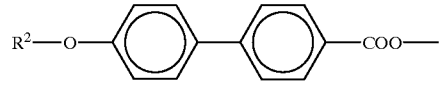

(2)

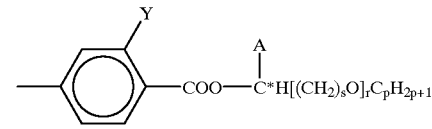

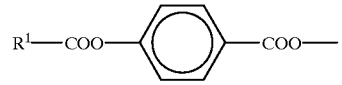

(3)

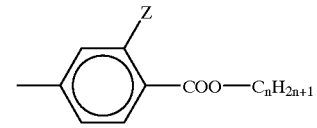

The above anti-ferroelectric liquid crystal composition has an anti-ferroelectric phase in a broad temperature range, has a high response time I in the transition from an anti-ferroelectric state to a ferroelectric state and a proper response time II in the transition from a ferroelectric state to an anti-ferroelectric state, and can therefore provide an anti-ferroelectric liquid crystal display device having high display quality.

10 Claims, No Drawings

ANTI-FERROELECTRIC LIQUID CRYSTAL COMPOSITION

DETAILED DESCRIPTION OF THE INVENTION

1. Field of the Invention

The present invention relates to a novel anti-ferroelectric liquid crystal composition containing a swallow-tailed compound and a liquid crystal display device using the composition.

2. Prior Art

A liquid crystal display device has been so far applied mainly to a variety of small-sized display devices owing to its performances such as low voltage operation, low power consumption and display capability with a thin screen. Further, with the recent application and expanded use of a liquid crystal display device in the fields of information, office automation-related machines and equipment and the field of television sets, there are rapidly increasing demands for large-sized liquid crystal display devices of high-performance which have a larger display capacity and a higher display quality than those of a conventional CRT display device.

However, as long as a presently available nematic liquid crystal is used in a display device, even an active matrix driven liquid crystal display device used in a liquid crystal television set has found it not easy to increase its size and decrease its production cost due to its complicated production process and a low yield. In a simple matrix driven STN liquid crystal display device, the driving of a large display capacity is not necessarily easy and its response time is limited, so that the display of video frames is difficult. Further, a liquid crystal display device for which the nematic liquid crystal is used has been encountering a big problem that its viewing angle is narrow.

Therefore, the nematic liquid crystal display device can hardly be said to satisfy demands for the above large-sized liquid crystal display device of high-performance actually.

Under the circumstances, a liquid crystal display device using a ferroelectric liquid crystal has been attracting attention as a liquid crystal display device with a fast response and a wide viewing angle. A surface stabilized ferroelectric liquid crystal (SSFLC) device disclosed by Clark and Lagerwall has been attracting attention in that it has a faster response and a wider viewing angle than those of the prior art. Its switching characteristics have been studied in detail, and a number of ferroelectric liquid crystal compounds have been synthesized for optimizing various physical property constants.

When a ferroelectric liquid crystal is used for a liquid crystal display device, however, it has such problems that a contrast is low because its threshold characteristic is insufficient and its layer has a chevron structure, that a fast response is not attained, that it is not easy to accomplish the bistability which is one of the greatest characteristics of SSFLC because the alignment control of liquid crystal molecules is difficult, and that it is difficult to restore the alignment when it is destroyed by a mechanical shock. It is therefore required to overcome the above problems in order to put the device to practical use.

Besides the above, developments of devices having switching mechanisms different from that of SSFLC are also under way. Switching among tristable states of a liquid crystal compound having an anti-ferroelectric phase (to be referred to as "anti-ferroelectric liquid crystal compound" hereinafter) is also one of these new switching mechanisms (Japanese Journal of Applied Physics, Vol. 27, pp. L729, 1988).

The anti-ferroelectric liquid crystal device has three stable states, i.e., two uniform states (Ur, Ul) observed in a ferroelectric liquid crystal device and a third state. Chandani et al report that the above third state is an anti-ferroelectric phase (Japanese Journal of Applied Physics, Vol. 28, pp. L1261, (1989), Japanese Journal of Applied Physics, Vol. 28, pp. L1265, (1989)).

The above switching among tristable states is the first characteristic of an anti-ferroelectric liquid crystal device.

The second characteristic of the anti-ferroelectric liquid crystal device is that a sharp threshold value exists in respect to an applied voltage.

Further, the anti-ferroelectric liquid crystal device has a memory effect, which is the third characteristic of the anti-ferroelectric liquid crystal device. The above excellent characteristics serve to accomplish a liquid crystal display device having a fast response and a good contrast.

The anti-ferroelectric liquid crystal has another great characteristic in that its layer structure easily performs switching when an electric field is applied (Japanese Journal of Applied Physics, Vol. 28, pp. L119, 1989, Japanese Journal of Applied Physics, Vol. 29, pp. L111, 1990). The above characteristics permit the production of a liquid crystal display device free of defects and capable of self-restoring an alignment, and a liquid crystal device having an excellent contrast can be attained.

Further, it has been demonstrated that the gray scaling, which is hardly possible to achieve with a ferroelectric liquid crystal device, is possible to achieve with an anti-ferroelectric liquid crystal device. It has been consequently made possible to shift toward a full-color display, and an anti-ferroelectric liquid crystal is further increasing its significance (Preprints of No. 4 Ferroelectric Liquid Crystal International Symposium, page 77, (1993)).

While an anti-ferroelectric liquid crystal display device has been gaining a firm predominant position as described above, it is desired to broaden its driving temperature range and improve its response speed. Further, it is desired to develop an anti-ferroelectric liquid crystal having a smetic A phase.

Concerning the response speed, an anti-ferroelectric liquid crystal has two switching processes: one from an anti-ferroelectric state to a ferroelectric state and the other from the ferroelectric state to the anti-ferroelectric state. The speed of these two switching processes based on voltage, i.e., response speed, is an important factor for determining display quality.

The response speed from the anti-ferroelectric state to the ferroelectric state (to be referred to as "response speed I" hereinafter) is important since it is, for example, a writing speed per line of scanning lines in line sequential scanning simple matrix driving so that it determines the number of scanning lines which constitute one frame. The number of scanning lines can be increased as the response speed I increases, so that a high-resolution device can be achieved.

On the other hand, concerning the response speed from a ferroelectric state to an anti-ferroelectric state (to be referred to as "response speed II" hereinafter), a required speed varies depending upon a design of a driving method of a device. For example, it varies depending upon the set voltage of an offset voltage.

However, when the response speed II is too fast, a ferroelectric state cannot be maintained (i.e., a light or dark state cannot be maintained), constant brightness cannot be maintained and hence, a problem occurs on a contrast. When it is too slow, no change from a ferroelectric state to an anti-ferroelectric state takes place (i.e., no rewriting from a light or dark state to a dark or light state can be performed), so that no driving is possible. Further, when a change to a ferroelectric state is not completed within one frame, a change is carried over to a subsequent frame. As such states are accumulated, no sufficient dark state is achieved and the contrast decreases.

Accordingly, the response speed II has a considerable influence on display quality. The response speed II is determined to be an optimum value after a driving method is determined. For this purpose, the response speed II is preferably changeable to some extent. Considering various driving methods, the response speed II is preferably set to be between 1 and 5 milliseconds.

Problems to be Solved by the Invention

It is practically desirable that an anti-ferroelectric liquid crystal has a further improved response speed, permits the determination of a proper response speed, has a broadened temperature range of an anti-ferroelectric phase and has a smectic A phase.

M. Nakagawa has shown that the response speed of an anti-ferroelectric liquid crystal depends upon the rotation viscosity of liquid crystal molecules (Masahiro Nakagawa, Japanese Journal of Applied Physics, 30, 1759 (1991)). That is, the response speed increases as the viscosity decreases. Further, when the response speed relative to temperature is observed, the response speed decreases exponential-functionally in the temperature range lower than room temperature. An anti-ferroelectric liquid crystal generally has a high viscosity since its liquid crystal phase is a smectic phase, so that its viscosity sharply increases on a low-temperature side, and it is assumed that the response speed I sharply decreases due to the viscosity resistance thereof.

In one specific method for overcoming the above problem, it is considered to make an attempt to add a compound having a relatively low viscosity to a liquid crystal composition to decrease the viscosity of the composition as a whole for improving the response speed I. The above method is considered to be the most practical solution at present. However, this method tends to drop the upper limit temperature of the anti-ferroelectric phase, and it causes a problem in respect of the temperature range of the anti-ferroelectric phase, although the response speed is improved.

When the use of an anti-ferroelectric liquid crystal device as a display is considered, the device is assumed to have a temperature of at least about 400° C. due to heat of backlight. Therefore, the upper-limit temperature of the anti-ferroelectric phase is required to be at least 40° C. for normal driving of the device. Further, on the low-temperature side, the device is required at least to be driven at 10° C. The lower-limit temperature of the anti-ferroelectric phase is therefore desired at least to be 0° C.

It is therefore required to improve the response speed I, while paying attention to the temperature range of an anti-ferroelectric phase.

On the other hand, almost no findings are there on the control of the response speed II. The response speed II is considered to have dependency on viscosity like the response speed I, but the dependency is considered small. Conventionally, the response speed II is generally controlled by incorporating an anti-ferroelectric liquid crystal having a proper response speed II. However, it is difficult to balance the characteristics other than the response speed II, and it has been difficult to determine the response speed II with some degree of freedom.

The present invention has been made in view of the above points. It has been found that a composition prepared by combining a swallow-tailed compound having a specific structure with a specific anti-ferroelectric liquid crystal mixture can have an anti-ferroelectric phase in a broad temperature range, has no adverse effect on the response speed I and permits the determination of the response speed II with some degree of freedom, and the present invention has been accordingly completed.

Means for Solving the Problems

According to the present invention, there is provided an anti-ferroelectric liquid crystal composition consisting essentially of:

(a) a swallow-tailed compound of the formula (1),
(b) an anti-ferroelectric liquid crystal compound of the formula (2), and
(c) a phenyl ester compound of the formula (3),

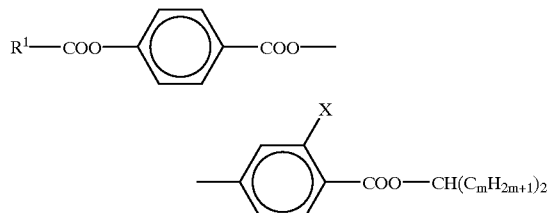

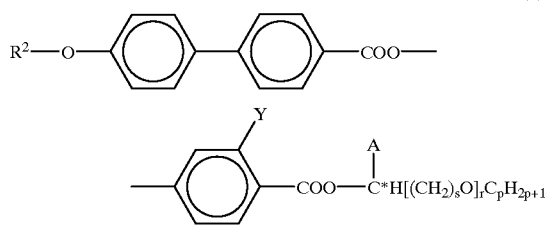

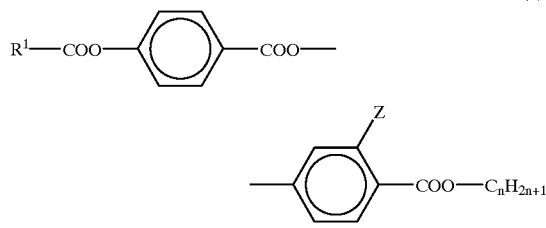

wherein, in the formula (1), $R^1$ is a linear alkyl group having 4 to 10 carbon atoms, X is a hydrogen atom or a fluorine atom, and m is an integer of 2 or 3;

in the formula (2), $R^2$ is a linear alkyl group having 6 to 12 carbon atoms, Y is a hydrogen atom or a fluorine atom, A is —$CH_3$ or —$CF_3$, r is 0 or 1, provided that r is 0 and p is an integer of 4 to 10 when A is —$CH_3$ and that p is an integer of 6 to 8 when A is —$CF_3$ and r is 0 and that s is an integer of 5 to 8 and p is an integer of 2 or 4 when A is —$CF_3$ and r is 1, and C* is an asymmetric carbon atom; and in the formula (3), $R^3$ is a linear alkyl group having 5 to 10 carbon atoms, Z is a hydrogen atom or a fluorine atom, and n is an integer of 5 to 10.

Compounds of the above formulae (1) to (3) for constituting the anti-ferroelectric liquid crystal composition of the present invention will be explained below.

In the compound of the above formula (1), a methylene group (—CH<) forms an ester bond on the right side end of the compound, and two alkyl groups (—$C_mH_{2m+1}$) having same carbon numbers are bonded to the methylene group in a shape of a swallow tail. Therefore, the compound of the formula (1) is named "swallow-tailed compound". In the swallow-tailed compound of the formula (1), $R^1$ is a linear alkyl group having 4 to 10 carbon atoms, X is a hydrogen atom or a fluorine atom, and m is an integer of 2 or 3. Preferred is a compound of the formula (1) in which $R^1$ is a linear alkyl group having 9 carbon atoms, X is a fluorine atom and m is 2.

The compound of the above formula (2) is an anti-ferroelectric liquid crystal compound. In the formula (2), $R^2$ is a linear alkyl group having 6 to 12 carbon atoms, Y is a hydrogen atom or a fluorine atom, A is —$CH_3$ or —$CF_3$, r is 0 or 1, and C* is an asymmetric carbon.

The compound of the formula (2), however, is classified into the following three types of compounds, depending on A and r.
① When A is —$CH_3$, r is 0 and p is an integer of 4 to 10.
② When A is —$CF_3$ and r is 0, p is an integer of 6 to 8.
③ When A is —$CF_3$ and r is 1, s is an integer of 5 to 8 and p is an integer of 2 or 4.

Preferred are (a) a compound of the formula (2) in which Y is a fluorine atom, A is —$CF_3$, r is 1, s is an integer of 5 to 8 and p is an integer of 2 or 4, and (b) a compound of the formula (2) in which Y is a fluorine atom, A is —$CH_3$, r is 0 and p is an integer of 4 to 6. The above compounds (a) and (b) are both preferred as a compound of the formula (2), and in view of a balance of various properties of a liquid crystal display device, it is more preferable to use a mixture of the above compounds (a) and (b).

In the phenyl ester compound of the above formula (3), $R^3$ is a linear alkyl group having 5 to 10 carbon atoms, Z is a hydrogen atom or a fluorine atom, and n is an integer of 5 to 10. Preferred is a compound of the formula (3) in which $R^3$ is a linear alkyl group having 9 carbon atoms, Z is a fluorine atom and n is 8.

The anti-ferroelectric liquid crystal composition of the present invention consists essentially of a mixture of the compounds of the above formulae (1), (2) and (3). The proportion of the compounds of the above formula (1), (2) and (3) in the anti-ferroelectric liquid crystal composition are as follows. The amount of the compound of the formula (1) is 1 to 60 mol %, preferably 10 to 40 molt. The amount of the compound of the formula (2) is 30 to 80 mol %, preferably 40 to 70 mol %. Further, the amount of the compound of the formula (3) is 1 to 30 mol %, preferably 5 to 20 mol %.

Further, it is practically preferable that the anti-ferroelectric liquid crystal composition of the present invention has at least a smectic A phase in a temperature range of from 0 to 40° C. and has a smectic A phase at a temperature higher than that of the anti-ferroelectric phase.

The anti-ferroelectric liquid crystal composition of the present invention is advantageously used for a simple matrix liquid crystal display device comprising the anti-ferroelectric liquid crystal composition, which is interposed between a pair of electrode substrates formed by arranging scanning electrodes and signal electrodes in a matrix form.

The swallow-tailed compound of the formula (1) used in the present invention can be easily prepared according to a method which the present inventors have already proposed.

For example, a compound of the formula (1) in which m=2 can be prepared by the following method.
(a) $R^1COCl+HO$—Ph—COOH→$R^1COO$—Ph—COOH
(b) (a)+$SOCl_2$→$R^1COO$—Ph—COCl
(c) $(C_2H_5)_2CHOH+HO$—Ph(X)—COCl→HO—Ph(X)—COOCH$(C_2H_5)_2$
(d) (b)+(c)→End product wherein —Ph— is a 1,4-phenylene group and —Ph(X)— is a 1,4-phenylene group which may contain a fluorine atom substituted on its 2-position.

The above preparation method will be explained briefly as follows:
(a) shows a reaction between an aliphatic acid chloride and p-hydroxybenzoic acid.
(b) shows the formation of an acid chloride.
(c) shows a reaction between an aliphatic alcohol and p-hydroxybenzoic acid chloride.
(d) shows a reaction for forming the end product.

The anti-ferroelectric liquid crystal compound of the formula (2) used in the present invention can be easily prepared according to a method which the present inventors have already proposed. For example, a compound of the formula (2) in which A=—$CF_3$, r=1, s=5 and p=2 can be prepared by the following method.
(e) AcO—Ph(Y)—COOH+$SOCl_2$→AcO—Ph(Y)—COCl
(f) (e)+HOC*H($CF_3$) $(CH_2)_5OC_2H_5$→AcO—Ph(Y)—COOC*H($CF_3$) $(CH_2)_5OC_2H_5$
(g) (f)+Ph—$CH_2NH_2$→HO—Ph(Y)—COOC*H($CF_3$) $(CH_2)_5OC_2H_5$
(h) $R^2O$—Ph—Ph—COOH+$SOCl_2$→$R^2O$—Ph—Ph—COCl
(i) (g)+(h)→Anti-ferroelectric liquid crystal compound (2)

wherein —Ph— is a 1,4-phenylene group, —Ph(Y)— is a 1,4-phenylene group which may contain a substituted fluorine atom, Ph— is a phenyl group, and C* is an asymmetric carbon atom.

The above preparation method will be explained briefly as follows:
(e) shows the chlorination of a fluorine-substituted or unsubstituted p-acetoxybenzoic acid with thionyl chloride.
(f) shows an esterification between a chlorinated product (e) and an alcohol.
(g) shows the deacetylation of an ester (f).
(h) shows the chlorination of an alkyloxybiphenylcarboxylic acid.
(i) shows a reaction between a phenol (g) and an acid chloride (h) to produce the liquid crystal compound.

EXAMPLES

The present invention will be explained more in detail with reference to Examples and Comparative Example hereinafter, while the present invention shall not be limited thereto.

Example 1

The following compounds corresponding to the compounds of the formulae (1), (2) and (3) in the present invention were mixed in the following proportion shown below, to prepare an anti-ferroelectric liquid crystal composition.

Formula (1):
$C_9H_{19}$—COO—Ph—COO—Ph(3F)—COO—CH$(C_2H_5)_2$ 30 mol %
Formula (2):
$C_9H_{19}$—O—Ph—Ph—COO—Ph(3F)—COO—C*H$(CF_3)$ $(CH_2)_5OC_2H_5$ 37.5 mol %
Formula (2):
$C_8H_{17}$—O—Ph—Ph—COO—Ph(3F)—COO—C*H$(CH_3)$ $C_5H_{11}$ 22.5 mol %
Formula (3):
$C_9H_{19}$—COO—Ph—COO—Ph(3F)—COO—$C_8H_{17}$ 10 mol % wherein —Ph— is a 1,4-phenylene group, —Ph(3F)— is a 1,4-phenylene group which contains a fluorine atom substituted on its 3-position, and C* is an asymmetric carbon atom.

Table 1 shows the phase sequence of the liquid crystal composition prepared above.

Further, the liquid crystal composition was measured for response time at 30° C., and Table 1 shows the result. The response time was measured as follows.

A liquid crystal cell (cell gap 2 μm) having ITO electrodes and a rubbed polyimide thin film (30 nm) was charged with the above composition in an isotropic state. Then, the cell was gradually cooled at a rate of 1.0° C./minute to align the liquid crystal. The cell was interposed between the crossed polarizers in such a way that the layer direction of the liquid crystal was in parallel with an analyzer or a polarizer.

The minimum of light transmittance was set to be 0%, and the maximum of light transmittance was set to be 100%. The response time I was defined to be a length of time for which the light transmittance changed from 10% to 90% when a voltage of 50 V and 10 Hz was applied at 30° C., and the response time II was defined to be a length of time for which the light transmittance changed from 90% to 10%.

Comparative Example 1

Example 1 was repeated except that the compound corresponding to the compound of the formula (1) was replaced with the following racemic compound.

$C_9H_{19}$—COO—Ph—COO—Ph(3F)—COO—CH$(CH_3)$ $C_8H_{17}$ (racemic compound)

As is clear from a comparison between the results of Example 1 and Comparative Example 1, the use of the swallow-tailed compound permitted the response time II at a desirable rate without impairing the characteristic of the response time I.

TABLE 1

|  | Phase sequence | Response time I | Response time II |
| --- | --- | --- | --- |
| Ex. 1 | Cr(<-20)SCA*(63)SA(84)I | 14.9 μ sec. | 1,100 μ sec. |
| C. Ex. 1 | Cr(<-10)SCA*(65)SA(85)I | 17.1 | 9,900 |

Ex. = Example,
C. Ex. = Comparative Example

In the phase sequence, parenthesized values show phase transfer temperatures (°C.), Cr is a crystal phase, SCA* is an anti-ferroelectric phase, SA is a smectic A phase, and I is an isotropic phase.

Example 2

The following compounds corresponding to the compounds of the formulae (1), (2) and (3) in the present invention were mixed in the following proportion shown below, to prepare an anti-ferroelectric liquid crystal composition.

Formula (1):
$C_9H_{19}$—COO—Ph—COO—Ph(3F)—COO—CH$(C_2H_5)_2$        15 mol %
Formula (2):
$C_9H_{19}$—O—Ph—Ph—COO—Ph(3F)—COO—C*H$(CF_3)(CH_2)_5OC_2H_5$        52.5 mol %
Formula (2):
$C_8H_{17}$—O—Ph—Ph—COO—Ph(3F)—COO—C*H$(CH_3)C_5H_{11}$        22.5 mol %
Formula (3):
$C_9H_{19}$—COO—Ph—COO—Ph(3F)—COO—$C_8H_{17}$        10 mol % wherein —Ph— is a 1,4-phenylene group, —Ph(3F)— is a 1,4-phenylene group which may contain a fluorine atom substituted on its 3-position, and C* is an asymmetric carbon.

Table 2 shows the results.

Comparative Example 2

The following compounds corresponding to the compounds of the formulae (1) and (2) in the present invention were mixed in the following proportion shown below, to prepare an anti-ferroelectric liquid crystal composition.

Formula (1):
$C_9H_{19}$—COO—Ph—COO—Ph(3F)—COO—CH$(C_2H_5)_2$        40 mol %
Formula (2):
$C_9H_{19}$—O—Ph—Ph—COO—Ph(3F)—COO—C*H$(CF_3)(CH_2)_5OC_2H_5$        37.5 mol %
Formula (2):
$C_8H_{17}$—O—Ph—Ph—COO—Ph(3F)—COO—C*H$(CH_3)C_5H_{11}$        22.5 mol %

Table 2 shows the results.

TABLE 2

| | | Response time | |
|---|---|---|---|
| | Phase sequence | I | II |
| Ex. 2 | Cr(<-20)SCA*(72)SC*(77)SA(92)I | 16 μ sec. | 1,800 μ sec. |
| C. Ex. 2 | Cr(<-20)SCA*(72)SC*(74)SA(96)I | 22 | 4,800 |

Ex. = Example,
C. Ex. = Comparative Example

Effect of the Invention

The present invention provides a novel anti-ferroelectric liquid crystal composition. The novel anti-ferroelectric liquid crystal composition provided by the present invention has an anti-ferroelectric phase in a broad temperature range, has a high response speed I in the transition from an anti-ferroelectric state to a ferroelectric state and can show a proper response speed II in the transition from a ferroelectric state to an anti-ferroelectric state. The anti-ferroelectric liquid crystal composition of the present invention can therefore provide an anti-ferroelectric liquid crystal display device having high quality in display.

What is claimed is:

1. An anti-ferroelectric liquid crystal composition consisting essentially of:

(a) a swallow-tailed compound of the formula (1), (b) an anti-ferroelectric liquid crystal compound of the formula (2), and (c) a phenyl ester compound of the formula (3),

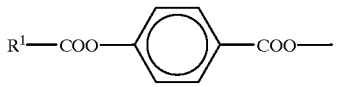

(1)

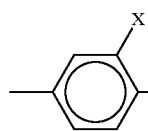

(2)

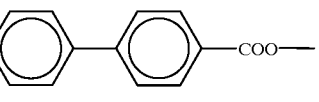

(3)

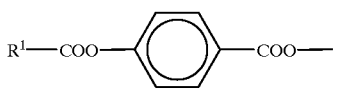

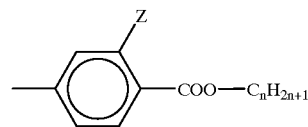

wherein, in the formula (1), $R^1$ is a linear alkyl group having 4 to 10 carbon atoms, X is a hydrogen atom or a fluorine atom, and m is an integer of 2 or 3;

in the formula (2), $R^2$ is a linear alkyl group having 6 to 12 carbon atoms, Y is a hydrogen atom or a fluorine atom, A is —$CH_3$ or —$CF_3$, r is 0 or 1, provided that r is 0 and p is an integer of 4 to 10 when A is —$CH_3$ and that p is an integer of 6 to 8 when A is —$CF_3$ and r is 0 and that s is an integer of 5 to 8 and p is an integer of 2 or 4 when A is —$CF_3$ and r is 1, and C* is an asymmetric carbon atom; and in the formula (3), $R^3$ is a linear alkyl group having 5 to 10 carbon atoms, Z is a hydrogen atom or a fluorine atom, and n is an integer of 5 to 10.

2. The composition of claim 1, wherein, in the formula (1), $R^1$ is a linear alkyl group having 9 carbon atoms, m is 2 and X is a fluorine atom.

3. The composition of claim 1 or 2, wherein, in the formula (2), Y is a fluorine atom, A is —$CF_3$, r is 1, s is an integer of 5 to 8, and p is an integer of 2 or 4.

4. The composition of claim 1 or 2, wherein, in the formula (2), Y is a fluorine atom, A is —$CH_3$, r is 0, and p is an integer of 4 to 6.

5. The composition of claim 1 or 2, wherein, in the formula (3), $R^3$ is a linear alkyl group having 9 to 15 carbon atoms, Z is a fluorine atom, and n is 8.

6. The composition of claim 1, wherein the composition contains 1 to 60 mol % of the swallow-tailed compound of the formula (1), 30 to 80 mol % of the anti-ferroelectric liquid crystal compound of the formula (2) and 1 to 30 mol % of the phenyl ester compound of the formula (3).

7. The composition of claim 1, wherein the composition has at least a smectic A phase in a temperature range of from 0 to 40° C. and has a smectic A phase at a temperature higher than that of the anti-ferroelectric phase.

8. A simple matrix liquid crystal display device comprising the anti-ferroelectric liquid crystal composition of claim 1, which is interposed between a pair of electrode substrates formed by arranging scanning electrodes and signal electrodes in a matrix form.

9. The composition of claim 3, wherein, in the formula (3), $R^3$ is a linear alkyl group having 9 to 15 carbon atoms, Z is a fluorine atom, and n is 8.

10. The composition of claim 4, wherein, in the formula (3), $R^3$ is a linear alkyl group having 9 to 15 carbon atoms, Z is a fluorine atom, and n is 8.

* * * * *